Dec. 29, 1953 W. J. BENTSEN 2,664,062

METHOD OF DIE STAMPING AND DRAWING

Filed April 28, 1947 2 Sheets-Sheet 1

INVENTOR
W. J. BENTSEN
BY E. E. Woodbury
ATTORNEY

INVENTOR
W. J. BENTSEN
BY
E. L. Woodbury
ATTORNEY

Patented Dec. 29, 1953 2,664,062

UNITED STATES PATENT OFFICE 2,664,062

METHOD OF DIE STAMPING AND DRAWING

William J. Bentsen, San Diego, Calif., assignor to Solar Aircraft Company, San Diego, Calif., a corporation of California Application April 28, 1947, Serial No. 744,374

1 Claim. (Cl. 113—51)

This invention relates to the art of shaping sheet metal between complementary dies and is particularly useful in connection with shapes involving a steep portion surmounted by a flat portion which merges into the steep portion at a sharp shoulder. With the methods heretofore used, there has been a pronounced thinning of the metal at and adjacent the shoulder, and an object of the invention is to reduce or eliminate excessive local thinning of the metal.

Another object is to provide a method of producing a thickening of the metal in a die stamping at desired local areas.

This is a continuation in part of my application Serial No. 616,869, filed September 17, 1945, now Patent No. 2,495,402, issued January 24, 1950.

Briefly, I accomplish the foregoing objects by preshaping the metal sheet, prior to placing it between the final dies, in such a way as to provide a bulge, or wrinkles, in the sheet at or adjacent the area that would otherwise be excessively thinned. The bulge, or wrinkles, causes the sheet to have a greater absolute area locally in the region where the final dies would normally stretch and thin the metal excessively. By suitably controlling the extent and position of the bulge, the thinning of the metal that would otherwise occur can be partially, fully, or over, compensated for. Over-compensation produces an actual thickening of the sheet and is desirable where local reinforcement is advantageous.

Such local thickening for reinforcing purposes is highly desirable in such structures as aircraft exhaust manifolds where long life without excessive weight is an objective. In such instances the local areas that can desirably be thickened are those exposed to the highest temperatures and to the highest impact of corrosive gases.

Experience shows that stamped manifold structures repeatedly fail at the same points, and failures can be reduced by thickening the wall at such points in accordance with the present invention.

It was found that failures in welded sheet metal manifolds frequently occurred at points adjacent the welds when the stamping had been thinned at those points in the stamping operation. The thickening of the metal adjacent the welds in accordance with the present invention has materially reduced the incidence of such failures.

As examples of points in manifold structures that are benefited by thickening, because of exposure to high temperatures and gas impingement, are the sides of collector rings immediately opposite the engine ports, and the downstream outer sides of sharp elbows. Thickening of such points produces more even expansion.

As examples of points in manifold structures that are benefited by thickening because of exposure to extra stresses, are the rigidly secured port legs of collector rings, where the ring is supported by the port legs. The invention is particularly useful where the collector rings are made up of independent, slidably connected sections mounted as cantilevers from the exhaust ports of an engine.

The shape and extent of the bulge or wrinkles produced in the preliminary shaping operation must be carefully controlled, else wrinkling of the sheet will be produced in the final dies, and there are disclosed herein procedures for preparing, from the final dies, preliminary dies that will impart the necessary bulge or wrinkles to the sheet. In accordance with one procedure, one of the two complementary final dies is altered by superimposing on certain areas thereof a dome or ridge of plastic material such as clay, and then using the altered die as a pattern from which to prepare a pair of complementary preliminary dies in which the sheet is preshaped. After preshaping in the preliminary dies, the sheet has a bulge which provides excess area at a local point as compared to the areas of the juxtaposed portions of the final die, so that during final closing movement of the final dies on the sheet the bulged area is either stretched to a lesser extent than it would be if it had not been preshaped, or is actually compressed so that its thickness is increased.

The present invention is particularly useful in connection with the invention of Burger and Skinner, Patent No. 2,383,706, issued August 28, 1945, and entitled "Method of Making Preliminary Shaping Dies." The procedure described in the Burger and Skinner patent involves the making of a preliminary die from a final die by first forming on the surface of the final die a substantially non-compressible and non-stretchable wax form, removing the form from the final die, flattening it to a suitable extent without materially altering its absolute area, and then using it as a pattern for the preliminary dies. The procedure in accordance with the present invention differs from that of the Burger and Skinner patent in that the non-compressible and non-stretchable pattern is formed on the original die after the latter has been altered by the addition of the clay dome or ridge, instead of constructing it directly on the original die.

In the drawing:

Figs. 11A to 15A are views corresponding to Figs. 11 to 15, respectively, but illustrating corresponding successive steps in accordance with the present invention.

Figure 1:
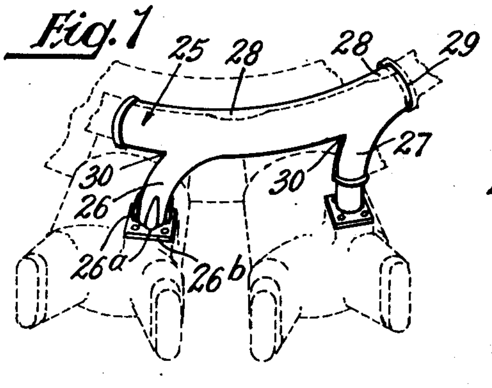
Fig. 1 is a perspective view of a section of an exhaust collector ring or manifold such as is used on radial airplane engines.

Referring to Fig. 1, there is shown a manifold section 25 that may consist of two matched half stampings welded together. The section has a rigid port leg 26 and an expansible port leg 27, the two legs being secured to adjacent cylinders of a radial engine. At its two opposite ends, the section 25 may slidably engage similar adjacent manifold sections.

Manifolds of this type are subjected to differential temperature stresses, the hottest points thereof being the areas marked 28 because of their positions directly opposite the port legs 26 and 27 as a result of which they must redirect the hot gases toward the exit end 29 of the section. The reentrant corners 30 are also subject to severe strains due to thermal expansion, because the thin sheet metal of the manifold section lengthens more than does the distance between the engine ports due to expansion of the engine.

Another highly stressed portion of the manifold is the rigid cantilever port leg 26, for it must transfer the stresses set up by vibration of the section 25, and these stresses are often built up to considerable amplitudes by harmonic vibration of the engine.

Figure 2:
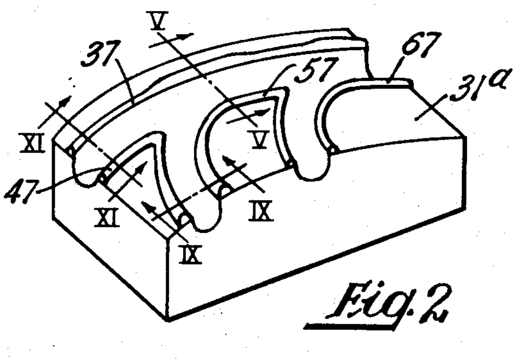
Fig. 2 is a die pattern in accordance with the present invention for forming the back half stamping of the manifold section shown in Fig. 1.

As has been previously indicated, it has been customary to form manifold sections such as the section 25 by welding together two mating half stampings. The general shape of one of the half stampings is illustrated in Fig. 2 which discloses a die pattern **31*a* for one of the half stampings, in this instance, the rear half stamping of the manifold section 25. The half stampings, as they come from the die, have diametrical flanges which are subsequently trimmed off before the edges of two mating half stampings are welded together. Thus the flanges of the two stampings shown welded together in Fig. 3 have been trimmed off at the dotted line 45, 45. The weld metal joining the two half stampings is indicated at 46**.

Figures 3, 4:
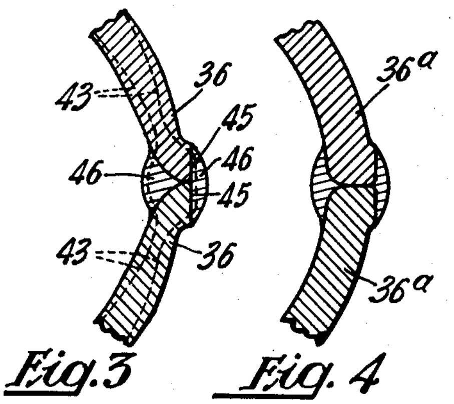
Fig. 3 is a cross section showing a portion of a manifold made from two half stampings prepared by a prior art process.
Fig. 4 is a cross section corresponding to Fig. 3 but showing a portion of a manifold made from stampings prepared by the present process.

Fig. 3 illustrates a structure formed in accordance with the practice of the prior art and it will be observed that both stampings are thinned excessively adjacent the weld as shown at 36, 36.

It is found that in service the thin portions 36 adjacent the seam run hotter than other portions, and, for this reason, suffer more rapid corrosion, with the result that they eventually become thinned to an even greater extent, as shown by the dotted lines 43 in Fig. 3. The reason why the prior art production methods produced the thinning as indicated at 36 will now be explained with reference to Figs. 11 to 15, inclusive.

The best prior art practice known to me is that disclosed in the patent to Burger et al. 2,383,706 which discloses a practical method of making a preliminary die from a final die for the better production of relatively deep stampings.

Figure 11:
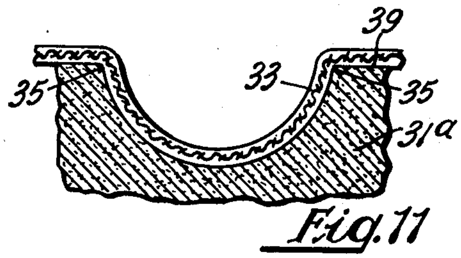
Figs. 11 to 15 are sectional views taken in a plane corresponding to plane XI—XI of Fig. 2, showing successive steps in the prior art process for comparison with the present process.
Figure 11A:
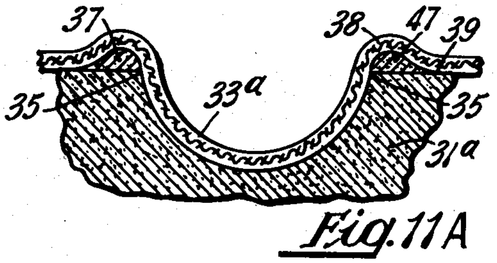
Figure 12:
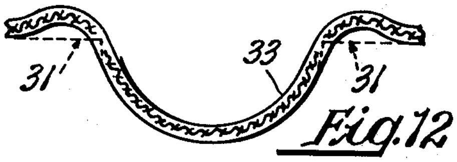
Figure 13:
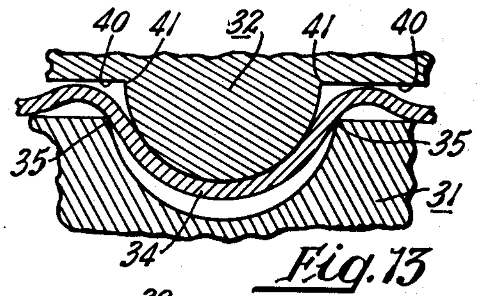
Figure 14:
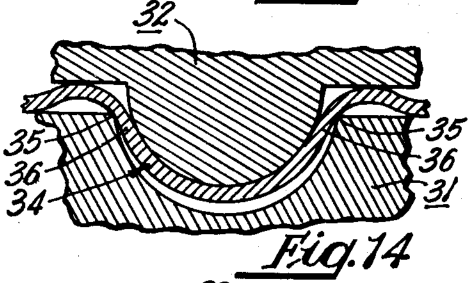
Figure 15:
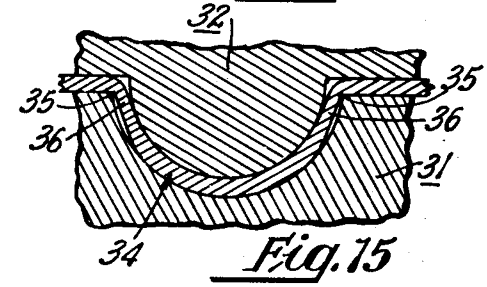

Referring first to Fig. 11, there is shown the plaster pattern **31*a* for the lower or female final die section 31, in which the stamping is to receive its final shaping. In accordance with the practice taught in the Burger et al. patent, a flexible wax pattern reinforced with cheesecloth, and indicated at 33 in Fig. 11, is formed directly over the die pattern 31*a* so that it conforms exactly with the shape thereof. This flexible pattern 33 is then removed from the die pattern 31*a* and is flattened, without materially changing its absolute area. The resultant change is indicated in Fig. 12. It will be noted from inspection of Fig. 12 that the pattern no longer falls entirely within the confines of the final die 31, the edges of which are indicated in dotted lines. The wax pattern, after being flattened, as indicated in Fig. 12, is then used to form a preliminary stage die, in accordance with the teachings of the Burger et al. patent, and from these preliminary dies a metal sheet 34 (Fig. 13) corresponding in shape to the pattern 33 is produced. Fig. 13 shows this sheet 34 positioned between the final die 31 and the punch 32 therefor. It will be observed from inspection of Fig. 13 that the lowermost portion of the punch 32 is engaging the sheet metal blank 34 near the middle thereof, and that the sharp edges 35 of the die 31 are engaging the blank 34 and supporting it. During subsequent closing movement of the punch 32 the sharp edges 35 of the die 31 bind against the metal blank 34**, causing the metal of the blank to be stretched and thinned adjacent the flanges as shown in Figs. 14 and 15.

A purpose of the present invention is to prevent the thinning of the metal near the seam as indicated at 36 in Fig. 3, and produce a manifold section of substantially uniform thickness throughout, as shown in Fig. 4. The practice in accordance with the present invention whereby this result is obtained will now be explained with reference to Figs. 11A to 15A inclusive.

First, beads 37, 47, 57, and 67 (Fig. 2) are formed along the edges of the opening in the final die 31 or the corresponding plaster pattern **31*a*. Those portions of the beads in the plane XI—XI of Fig. 2 are shown in the sectional view of Fig. 11A from which it will be observed that the two beads 37 and 47** are of substantially the same shape and dimensions and have their inner edges flush with the edges of the die cavity. These beads may be formed of various plastic materials but it has been found very satisfactory to use clay. After the beads have hardened sufficiently, the wax pattern 33a is formed thereon exactly as previously described with reference to Fig. 11. It will be observed that in Fig. 11A the underside of the wax pattern 33a follows the curved line 35, 38, 39, instead of the straight line 35, 39 in Fig. 11. This adds area to the pattern along the edges of the cavity.

Figure 12A:
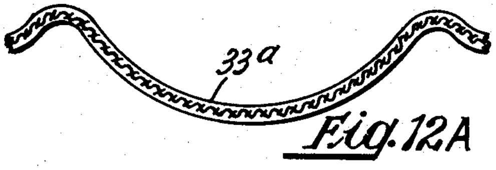

The wax pattern 33a is removed from the die pattern 31a and flattened as indicated in Fig. 12A. From this pattern, preliminary dies are then made and used to form a sheet metal blank 34a (Fig. 13A) into the same shape. This formed blank 34a is then stamped between the final dies, successive stages of the stamping operation being shown in Figs. 13A, 14A, and 15A, respectively.

Figure 13A:
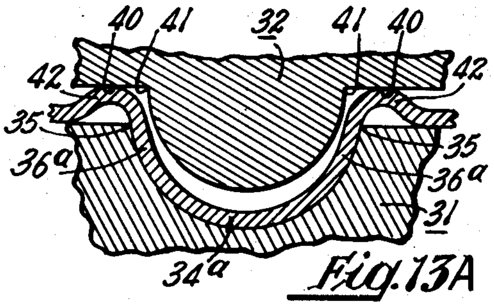
Figure 14A:
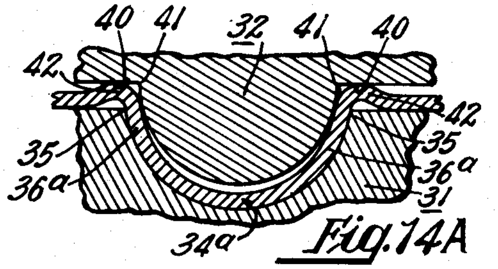
Figure 15A:
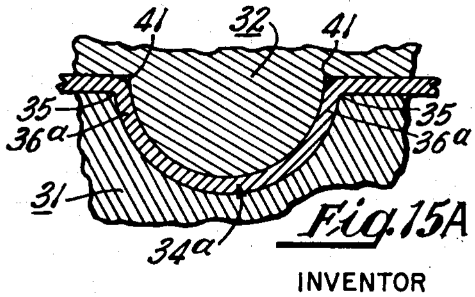

Although the stamping 34a as received from the preliminary dies may initially ride against the sharp edges 35 of the final die 31, this occurs only while the sheet is relatively unconfined and free to move. When the punch 32 approaches the die 31 more closely, as shown in Fig. 13A, the flat surfaces 40 of the punch 32 make contact with the bulges 42 of the preformed sheet 34a, forcing the lowermost curved portion of the blank 34a in compressive contact with the bottom of the die cavity. As the punch 32 continues to move into the die 31 as shown in Figs. 14A and 15A, the bulges 42 of the blank tend to flatten out and the metal is forced horizontally inwardly into the reentrant corners 41 of the punch 32. This lateral movement of the blank actually carries the undersurface thereof away from the sharp edges 35 of the die 31, and during the latter part of the stamping operation, from the instant that the bulges 42 come in contact with the punch 32, the operation is a compression forming operation rather than a drawing operation.

By judicious choice of the size of the beads 37, 47, et cetera, it is possible to keep the metal of the blank up to its original thickness, or in some instances to increase its thickness where that is desired.

A very important feature of the invention is that the metal can be forced into the reentrant corners 41 (Figs. 14A and 15A) to a considerably sharper radius than the actual metal thickness. The results of the process in forming manifolds of nearly constant cross section near the weld seam are illustrated in Fig. 4.

There are other areas of the manifold structure shown in Fig. 1 in which it is advantageous to maintain thickness or actually increase the thickness. As previously mentioned, the areas 28 (Fig. 1) opposite the onrushing gas from the port legs would normally be hotter than the surrounding portion. Figs. 5 to 8, inclusive, show how the thickness can be increased in the area 28 in accordance with the present invention.

Figure 5:
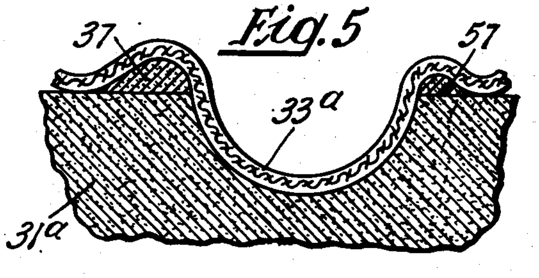
Fig. 5 is a cross section taken in the plane V—V of Fig. 2, showing a wax pattern formed in the die pattern of Fig. 2.

Thus referring to Fig. 5, it will be observed that in the section V—V of the area 28 (Figs. 1 and 2) the bead 37 is considerably larger than the bead 57, and larger than the bead 37 in the section XI—XI previously discussed.

Figure 6:
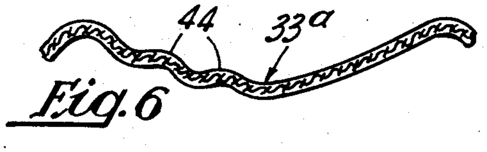
Fig. 6 is a section in the same plane as Fig. 5, showing the wax pattern reformed.
Figure 7:
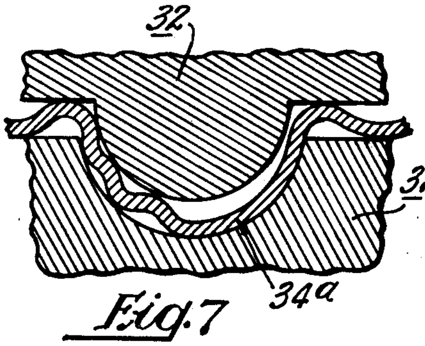
Fig. 7 is a sectional view taken in the plane corresponding to that of Fig. 5 but showing a stamping formed from the wax pattern of Fig. 6 in the process of being shaped between final dies.
Figure 8:
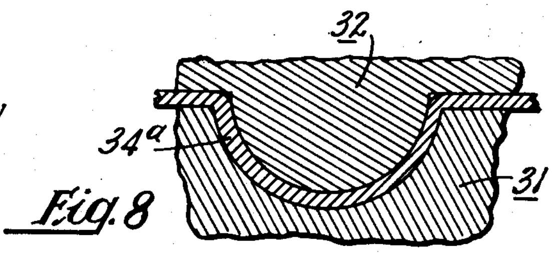
Fig. 8 is a view similar to Fig. 7 showing the dies fully closed.

The wax pattern 33a is then reformed in the areas adjacent the section V—V as shown in Fig. 6. It will be observed that the extra area obtained in the wax pattern by the large bead 37 of Fig. 5 is not retained but is reduced approximately to the size of its counter bead 57 which in turn is comparable to the beads 37 and 47 in Fig. 11A. The remainder of the additional area is moved over into the portion desired to be thickened by manually forming in the wax pattern 33a a plurality of undulations or corrugations 44, which undulations are reproduced in the metal blank formed with the preliminary dies prepared from the wax pattern. When the metal blank, having the undulations 44 therein, is pressed between the final punch and die 32 and 31 respectively, as shown in Figs. 7 and 8, the undulations are pressed out of the metal, and since the metal has no other place to go the section is thickened in that region. The thickening of the metal has been considerably exaggerated in Fig. 8, to make it apparent. Generally it is only a few thousandths of an inch, and it is made possible by a slight shift of the punch 32 to the right in Fig. 8, and by wear of the dies where the metal is thickest. In the stamping of stainless steel between dies of relatively soft alloys, as is the general practice, the dies wear very rapidly at the areas where the steel is thickest, until substantially uniform pressures are exerted at all points.

Figure 9:
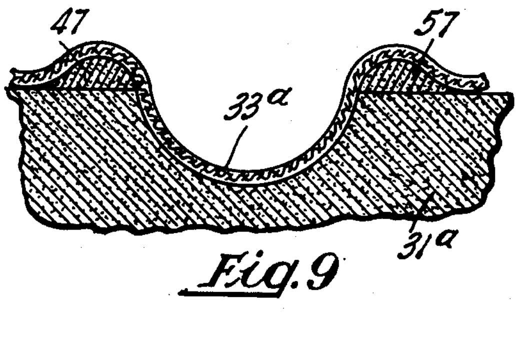
Fig. 9 is a cross section similar to Fig. 5, but taken in the plane IX—IX of Fig. 2.
Figure 10:
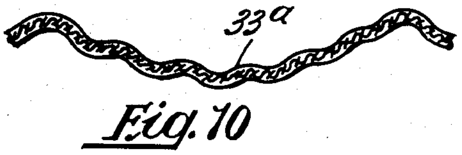
Fig. 10 is a section in the same plane as Fig. 9, showing the wax pattern reformed.

While it would be possible to thicken the manifold all the way around, as will be described later in connection with Figs. 9 and 10, it would not be desirable to do this in the sections of the areas 28 of Fig. 1. The purpose here is to distribute the metal of the manifold in such a way that there will be a nearly even temperature around the perimeter of any cross section, in spite of the fact that the gas may impinge on only a localized area of that cross section.

There are portions of the manifold structure shown in Fig. 1 in which it is desirable to thicken the entire perimeter of the cross section as compared with the section as a whole. Such an area is the cantilever port leg 26 because of the fact that the entire section 25 is cantilevered from the engine cylinder to which the port leg 26 is attached. Vibrational stresses are therefore greater in this port leg than in any other section of the manifold section, and it is desirable that the walls of the port leg increase in thickness as the port leg flange 26b is approached. As shown in Fig. 1, the port leg 26 is further reinforced by projections 26a extending from the flange 26b and welded to the port leg. However, even in addition to this, increased thickness of the walls is desired and this is obtained by making the beads 47 and 57 (Fig. 2) of greater thickness in and adjacent the plane IX—IX of Fig. 2. This increased dimension of the beads 47 and 57 is clearly shown in Fig. 9. After the wax pattern 33a has been removed from the die 31, the additional area that has been provided by the large beads 47 and 57 is transferred in part into undulations corresponding to the undulations 44 of Fig. 6, but extending over the entire curved portion of the wax sheet. When the resultant metal blank having corresponding undulations therein is pressed in the final die, it results in a substantial thickening of the metal over the entire section adjacent the plane IX—IX of Fig. 2, the thickness increasing as the end of the port leg is approached.

The invention has been explained by describing its application to the formation of one particular structural shape. Obviously the invention is useful in a variety of shapes and is therefore to be limited only to the extent set forth in the appended claim.

I claim:

In the art of stage forming sheet metal into a final article having a longitudinally curved trough portion having longitudinally extending flanges joining the trough portion at sharp shoulders, the method comprising preforming the metal between preliminary mating dies to produce longitudinally extending wrinkles in portions of said trough and to provide a bulge over a part of the flange portions closely adjacent said shoulders to provide excess metal at said wrinkles and said shoulders, and pressing the preformed sheet between mating final dies thereby placing said bulged portion and said wrinkles in said sheet in compression to prevent thinning in the stamping in the area adjacent said sharp shoulder and to thicken said trough at said wrinkles.

WILLIAM J. BENTSEN.

References Cited in the file of this patent

UNITED STATES PATENTS

| Number | Name | Date |
|---|---|---|
| 469,785 | Hart | Mar. 1, 1892 |
| 511,392 | White | Dec. 26, 1893 |
| 656,623 | Barthels | Aug. 28, 1900 |
| 670,592 | Merrill | Mar. 26, 1901 |
| 808,177 | Thiem | Dec. 26, 1905 |
| 1,225,915 | Zerk | May 15, 1917 |
| 1,265,954 | Pribil | May 14, 1918 |
| 1,423,372 | Vorsmann | July 18, 1922 |
| 1,699,361 | Karmazin | Jan. 15, 1929 |
| 1,892,754 | Tarbox | Jan. 3, 1933 |
| 1,999,229 | Benedict | Apr. 30, 1935 |
| 2,105,944 | Graf | Jan. 18, 1938 |
| 2,166,226 | Vehko | July 18, 1939 |
| 2,235,090 | Stall et al. | Mar. 18, 1941 |
| 2,383,706 | Burger | Aug. 28, 1945 |

FOREIGN PATENTS

| Number | Country | Date |
|---|---|---|
| 13,351 | Great Britain | of 1897 |